(12) United States Patent
Wehmann et al.

(10) Patent No.: US 8,145,537 B2
(45) Date of Patent: Mar. 27, 2012

(54) INTEGRATED SOFTWARE NETWORK AGENT

(75) Inventors: James M Wehmann, Independence, MN (US); Mary E Suddendorf, Waconia, MN (US); Brent D Shiely, Eden Prairie, MN (US); Daniel C Rohda, Rosemount, MN (US); Bethany L Jaworski, Porter, IN (US); David A Woolenberg, Woodinville, WA (US)

(73) Assignee: Digital River, Inc., Minnetonka, MN (US)

( * ) Notice: Subject to any disclaimer, the term of this patent is extended or adjusted under 35 U.S.C. 154(b) by 0 days.

(21) Appl. No.: 12/390,910

(22) Filed: Feb. 23, 2009

(65) Prior Publication Data

US 2009/0216861 A1    Aug. 27, 2009

Related U.S. Application Data

(60) Provisional application No. 61/030,358, filed on Feb. 21, 2008.

(51) Int. Cl.
*G06Q 30/00* (2006.01)
(52) U.S. Cl. ..................................................... 705/26.1
(58) Field of Classification Search .................. 705/26, 705/27, 26.1, 26.2, 26.25, 26.3, 26.35, 26.4, 705/26.41–26.44, 26.5, 26.61–26.64, 26.7, 705/26.8, 26.81, 26.82, 26.9, 27.1, 27.2
See application file for complete search history.

(56) References Cited

U.S. PATENT DOCUMENTS

| | | | |
|---|---|---|---|
| 6,029,141 A * | 2/2000 | Bezos et al. | 705/27 |
| 6,363,356 B1 * | 3/2002 | Horstmann | 705/26.7 |
| 7,110,982 B2 * | 9/2006 | Feldman et al. | 705/51 |
| 7,188,342 B2 * | 3/2007 | DeMello et al. | 717/173 |
| 7,356,557 B2 * | 4/2008 | Kikuchi et al. | 709/201 |
| 7,577,586 B2 * | 8/2009 | Frentzel-Beyme et al. | 705/14.64 |
| 2005/0086129 A1 * | 4/2005 | Patullo et al. | 705/27 |

(Continued)

FOREIGN PATENT DOCUMENTS

EP        1528454 A2      4/2005
(Continued)

OTHER PUBLICATIONS

"Electronic Fulfillment of Feature, Capacity and Subscription License Activation Keys via the License Management Systems (LMS)", Juniper Networks, Inc., Sep. 2009.*

*Primary Examiner* — Naeem Haq
(74) *Attorney, Agent, or Firm* — North Oaks Patent Agency; Shawn B. Dempster; Lynn M. Holly

(57) ABSTRACT

A model for the next generation of software network agents for downloadable software is provided. The software network agent delivers a streamlined user experience that presents the user with options to try or buy. The agent may be co-branded for merchant and affiliate marketing. The agent may be integrated with a number of services, such as ecommerce systems, affiliate marketing network systems, site optimization, web analytics and email marketing systems that enable a merchant to enhance the user experience and improve marketing. A user's actions may be tracked in order to provide OEMs and retailers payout on purchase referrals to the merchant's online store. Code changes and bug fixes can be made at the server and in a timely manner with minimal impact to the various systems supporting the software activation user experience.

6 Claims, 18 Drawing Sheets

U.S. PATENT DOCUMENTS

| | | |
|---|---|---|
| 2005/0108170 A1 | 5/2005 | Hailpern et al. |
| 2006/0048132 A1 | 3/2006 | Chen et al. |
| 2006/0059571 A1 | 3/2006 | Chen et al. |
| 2006/0200814 A1 | 9/2006 | Kontinen et al. |
| 2007/0041584 A1 | 2/2007 | O'Connor et al. |
| 2007/0150294 A1 | 6/2007 | Rusman et al. |
| 2007/0263870 A1 | 11/2007 | Czuchry |

FOREIGN PATENT DOCUMENTS

| | | |
|---|---|---|
| WO | 2006121324 A1 | 11/2006 |

* cited by examiner

702

* Required Fields

Salutation [Mr]
First Name* [ ]
Middle Name [ ]
Last Name* [ ]
Email* [ ]
Password* [ ]
Confirm Password* [ ]
Company* [ ]
Address* [ ]
Address2 [ ]
City* [ ]
State* [ ]
State Other
(Fill this out if you are
outside of the United States,
instead of state) [ ]
Zip/Postal Code* [ ]
Country* [United States]
Phone* [ ]
Fax [ ]

By checking this box, I affirm
that I have read, understand,
and agree to the Terms Of         [ ]
Agreement of this network.

BY CLICKING ON THE BUTTON BELOW, THE PERSON DOING SO REPRESENTS AND WARRANTS THAT (i) YOU ARE 18 YEARS
YOU HAVE THE POWER AND AUTHORITY TO BIND ADVERTISER; (iii) ADVERTISER HAS READ AND UNDERSTANDS THIS AGF
ACCEPTS THIS AGREEMENT; AND (v) YOU ARE AGREEING THAT YOU ARE OBLIGATED TO THIS AGREEMENT AS IF YOU HAD
PAPER.

Please type your full name in the box
with slashes around it. This will constitute a signature.    [ ]
Example: /John Smith/

[SAVE >>]

FIG. 7

INTEGRATED SOFTWARE NETWORK AGENT

This application claims the benefit of U.S. Provisional Application No. 61/030,358 filed 21 Feb. 2008, entitled "Software Network Agent," which is incorporated herein by reference.

FIELD OF THE INVENTION

The present invention relates to electronic commerce systems for use on the internet. More particularly, the present invention relates to tools for enabling the purchase, activation and installation of preloaded and downloaded software.

BACKGROUND OF THE INVENTION

Software publishers have discovered that selling physical copies of software through the more traditional sales channels has limitations and costs that can be minimized or eliminated by using innovative means such as preloaded distribution through affiliates (e.g., original equipment manufacturers (OEMs), or retailers) or internet downloads. Selling through these channels can minimize or avoid warehouse expenses, shipping costs, returns, end of life merchandise, limited catalog and limited stock. Preloading of software by OEM partners puts the product in the hands of the consumer as soon as they purchase a computer, and need only be activated to be used. On the other hand, downloaded software has an unlimited inventory, it is never out of stock and the publisher can always provide the latest version. The consumer is able to buy software and use it immediately. With either option, there is no delay between the decision to buy and the actual purchase, no waiting for delivery and no shipping costs.

Still, distributing software through these non-traditional channels has had some limitations. The current state of activating software obtained from these channels has been through the use of static, inflexible client-side activation processes that offer no opportunities for enhanced marketing strategies, such as site optimization, co-branding or affiliate marketing (compensating an OEM or retailer for referrals to a purchase), web analytic tracking or e-mail marketing. The current e-mail address information-gathering experience and acquisition rates are poor, resulting in a loss of important consumer contact information that could be used in valuable e-mail marketing campaigns. In addition, the current client-side activation assistants are difficult to update and revise and offer the customer no opportunity to purchase from the same page.

A need exists for an activation assistant that is a server-side, web-based application. Such a server-side application can offer the consumer the ability to activate a trial version, a limited-time license subscription, or a fully licensed version. The present invention provides a solution to these needs and other problems, and offers other advantages over the prior art.

BRIEF SUMMARY

An integrated software network agent (SNA) system and method solves the problems, and overcomes the limitations of conventional client-side software activation utilities. A system for providing an activation experience to end users through the manufacturer's relationships with OEMs, system builders, and/or retailers is described that allows the user to easily activate a trial version of a software program, purchase a limited-time subscription, or purchase a fully licensed version. Using server-side web and e-commerce processing and content provision, such a system offers a flexible activation process in which redesigns, code changes, bug fixes, etc. can be rolled out in a timely manner with minimal impact to the various systems supporting the software activation user experience. An SNA may be designed to deliver a co-branded, streamlined user experience that may ensure conversion of a software trial is credited back to the appropriate source. Additionally or alternatively, the SNA may interact with a web analytic system for web page performance tracking and reporting.

A preferred embodiment of the present invention consists of a generic desktop utility and a configuration file that customizes the generic desktop activation assistant. This preferred embodiment of the present invention may be configured to leverage existing web and ecommerce technologies, such as a global e-commerce system (i.e., a full framework e-commerce system), an affiliate marketing network tracking system (AMNS) and a web analytic system. The global e-commerce system delivers the product to the end user and provides a link to an affiliate relationship. The AMNS provides the data to produce the configuration file and the mechanism for tracking the source of the referral, and to compensate the party or parties responsible for the sale.

The combined use of these technological components can provide benefits for the merchant, for marketing affiliates, and for the consumer. Prior art client side application that perform similar functions are not customizable and code changes are difficult to implement. An integrated SNA, such as the one described herein, resolves these issues. A generic application and customized configuration file allow OEMs/system builders/retailers to co-brand software products with the merchant and perform dynamic targeting based on OEM profile setup. Track setup can be automated within the executable by identifying the OEM or retailer and their affiliation with the merchant. Such an SNA enabled system provides an easy, efficient and accurate means to pay OEMs/system builders/retailers through a scalable solution. In addition, a server-side SNA may have code and application changes without deploying new code to the individual OEMs/system builders/retailers. In other words, the user experience can be personalized and optimized by utilizing this server side application.

Additional advantages and features of the invention will be set forth in part in the description which follows, and in part, will become apparent to those skilled in the art upon examination of the following or may be learned by practice of the invention.

BRIEF DESCRIPTION OF THE DRAWINGS

FIG. 7 is a screen shot of an exemplary merchant-site campaign sign up page.

DETAILED DESCRIPTION

Many of the benefits attained by this invention are enabled by a client/server architecture. Simply stated, a client is a machine that requests services; a server responds to the request and provides services. The client machine is typically a desktop or notebook computer (PC) or a Netbook PC. A server is usually a powerful computer housing the web server software and content. It will be appreciated by those skilled in the art that the functions described below as being performed by a server may be distributed amongst several servers that collectively perform these server-based functions. For example, one server may host web pages while another may perform e-commerce functions such as order taking, management, and fulfillment.

Figure 1:
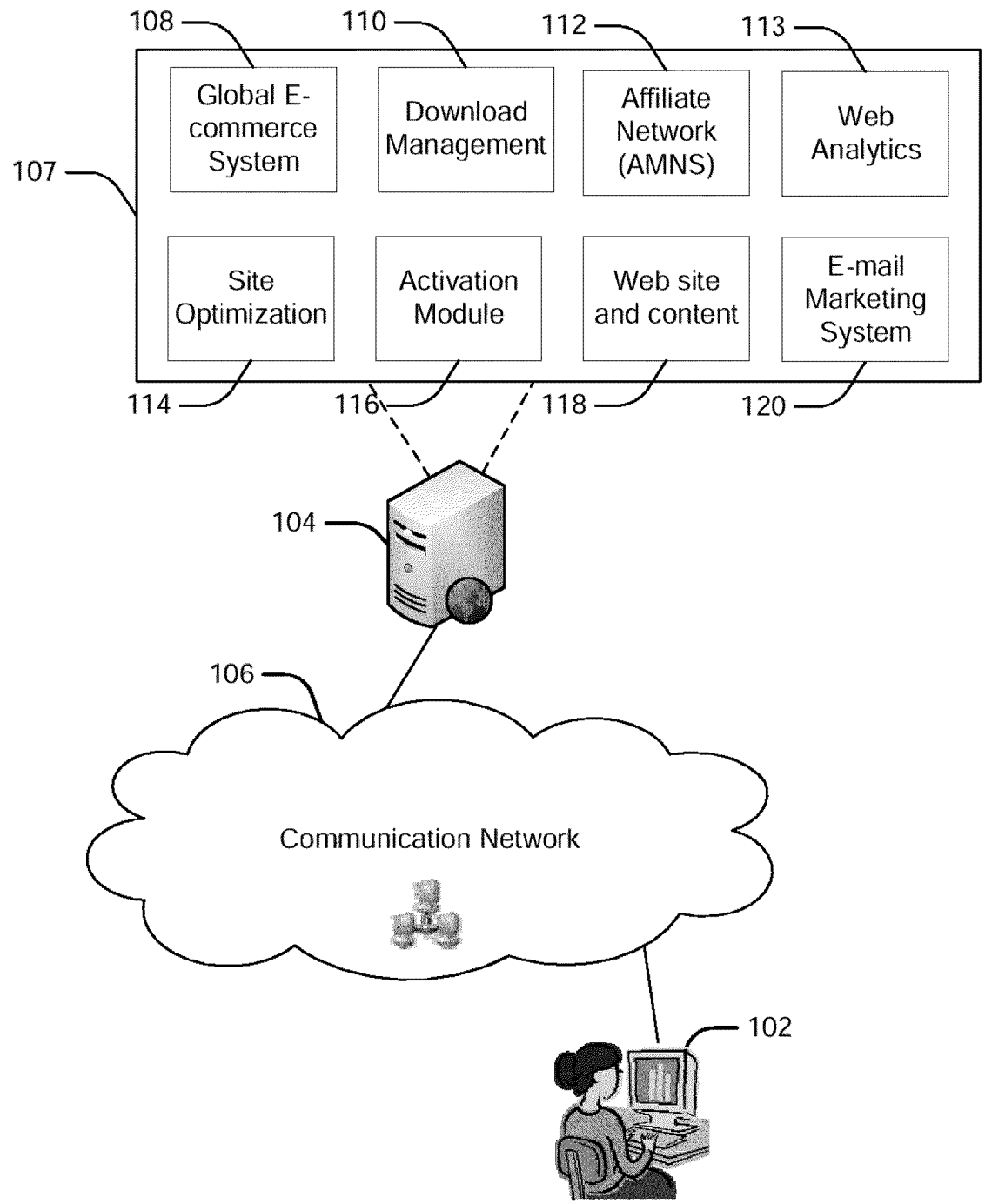
FIG. 1 illustrates a client/server system with web applications and services.

Referring to FIG. 1, the client 102 connects to the server 104 by way of a communications channel, such as the Internet's World Wide Web 106. In this case, the client is the web browser installed on the PC. The user at the client machine 102 enters into the browser the Uniform Resource Locator (URL) of the resource or service s/he wishes to access. The URL is used to construct a Hypertext Transfer Protocol (HTTP) request message which is sent via a communications protocol (such as Transfer Communications Protocol/Internet Protocol (TCP/IP)) to the web server 104 hosting the desired application or web site. The web server responds with a message containing the requested resource. Client/server architecture has enabled the internet to respond faster and more efficiently to user requests.

In this type of architecture, pieces of the user experience or back end tools and services (for example, e-commerce engine 108, download management 110, affiliate network management 112, web analytics 113, site optimization 114, activation 116, web site and content 118, and e-mail marketing 120) may be provided by the web server. By leveraging server side attributes, a dynamically customized and personalized activation experience may be provided. Using this structure, the content may be changed without ever impacting the client application. Because content 118 may be housed on a web server 104 associated with a site's e-commerce web pages 118, a site owner may utilize the same tools that are available for optimizing 114 and/or modifying the content or flow of those pages.

A preferred embodiment of the present invention may consist of a server-side 104 activation application 116 that can present the user with options to "try" (i.e. activate a trial) or "buy" software that may have been, for example, preloaded on a user's computer by the OEM or retailer or system builder, or downloaded from an online store. In the foregoing description, an OEM is mentioned several times and for the sake of simplicity reference to alternative equivalents such as retailers or system builders is often omitted. However, it will be appreciated by those skilled in the art that for purposes of the invention described herein any of these three type of entities may interchangeably utilize or otherwise perform the functions described herein without departing from the scope and spirit of the present invention.

An SNA may comprise a generic desktop utility and a configuration file. Implementation of a preferred embodiment system may involve leveraging the internet's client/server architecture and at least two existing e-commerce technologies: a global e-commerce system 108 and an affiliate marketing network system (AMNS) 112. While the invention is described in conjunction with the preferred embodiment system, it will be understood that it is not intended to limit the invention to this one embodiment.

It will be helpful to define some common terms and acronyms before proceeding with the detailed description:

Common Terms

Advertiser: Owner of one or more campaigns in an affiliate network marketing system. Has a relationship with one or more affiliates promoting his/her campaign and pays the affiliates based on clicks, leads, or sales generated for a given campaign.

Affiliate: Promoter of one or more campaigns in an affiliate marketing network system.

Affiliate Marketing Network System (AMNS): System used to co-brand, set up, track and pay advertisers and retailers for their referrals of end-users to the merchant's site and products.

Campaign: Offerings made available to affiliates by Advertisers. Contains a collection of creative and links for the purpose of driving traffic and sales to the merchant site. Campaigns may be configured to pay affiliates based on sales, clicks or leads.

Cost-Per-Sale Campaign (CPS): An affiliate marketing network campaign where Merchants pay affiliates who drive traffic to their site a specific amount per sale.

Creative: Image, text, HTML, email, etc. used by affiliates to drive traffic and sales to the merchant site.

Crippled Browser: A browser page configured to work with a specific (or a number of specific) URLs.

Download Manager Technology used to deliver a downloadable software product to an end consumer.

Download Server: An apparatus and system that provides a download servlet and tagging process for software products.

E-mail marketing system: A system designed to create and distribute e-mail marketing and promotions to a specific set of opt-in customers.

Global E-commerce System (e-commerce system): A sales and marketing system providing an online store, marketing assistance and optimization tools Merchandising Offer: A promotion or discount offered to shoppers in order to persuade them to make a purchase.

Merchant: The software manufacturer or distributor.

Original Equipment Manufacturer (OEM): Used in this document, an OEM is a computer manufacturer such as Dell, Hewlett-Packard, etc.

Redirect: A redirect occurs when an affiliate web site transfers traffic from its site to the Merchant's web site.

Site Optimization: Site optimization techniques include A/B testing and Multivariate testing. Optimization testing is a metric-based approach used to test site design, page flow, product offerings or promotions that result in the best user experience, conversion rates and revenue growth.

Software network agent (SNA): An application with the function of activating a trial version of a software application.

Web Analytic system: A web application used to track, collect and report web page performance statistics; web marketers use the analytic system to optimize their site.

System Components

Several embodiments of the SNA system and method may be implemented. The SNA may be integrated with an ecommerce system alone, or an ecommerce system and any number of other systems providing services to an ecommerce provider. A preferred embodiment of an SNA system may be a small web application comprising a generic desktop utility and a configuration file that may be integrated with a number of web applications or services. A generic desktop utility may act as a template that may be customized with merchant and affiliate information and graphics and may be presented to the user in his or her language as configured on the user's computer. Delivery and implementation of such a system and method may leverage a number of server side components 107, on one or more servers, such as the merchant's online e-commerce system (global e-commerce system) 108 and its affiliate marketing network system (AMNS) 112.

A global e-commerce system 108 may be a full service enterprise e-commerce solution, implemented on a network server 104 and configured to communicate with a plurality of servers 104 hosting web applications and client computers 102. In a preferred embodiment system, a component of the e-commerce system 108 being leveraged is the merchant's online store. When a user makes a purchase at a merchant's store directly from the activation screen, an AMNS 112 may interface with a global e-commerce system 108, allowing an AMNS 112 to track the source directing the purchase with the data in that file.

An AMNS 112 manages relationships between web advertisers (affiliates) and merchants, whereby an advertiser runs a merchant's ad campaign on its site for the purpose of driving traffic from the ad to the merchant's site. Networks of this type commonly track the traffic from the affiliate to the merchant and compensate the affiliate for any traffic that performs a predefined action, such as a purchase transaction or providing some information to the merchant. This type of network ensures that sales occurring via the network through the merchant's store are tracked back and credited to the appropriate OEM or Retailer. The preferred embodiment system leverages an affiliate marketing system 112 to download and distribute the generic desktop utility and SNA Configuration file to the client computer 102, to track the source of a consumer's visit to the merchant's online store, and to compensate the affiliate when a purchase is made through the merchant's store.

Figure 2:
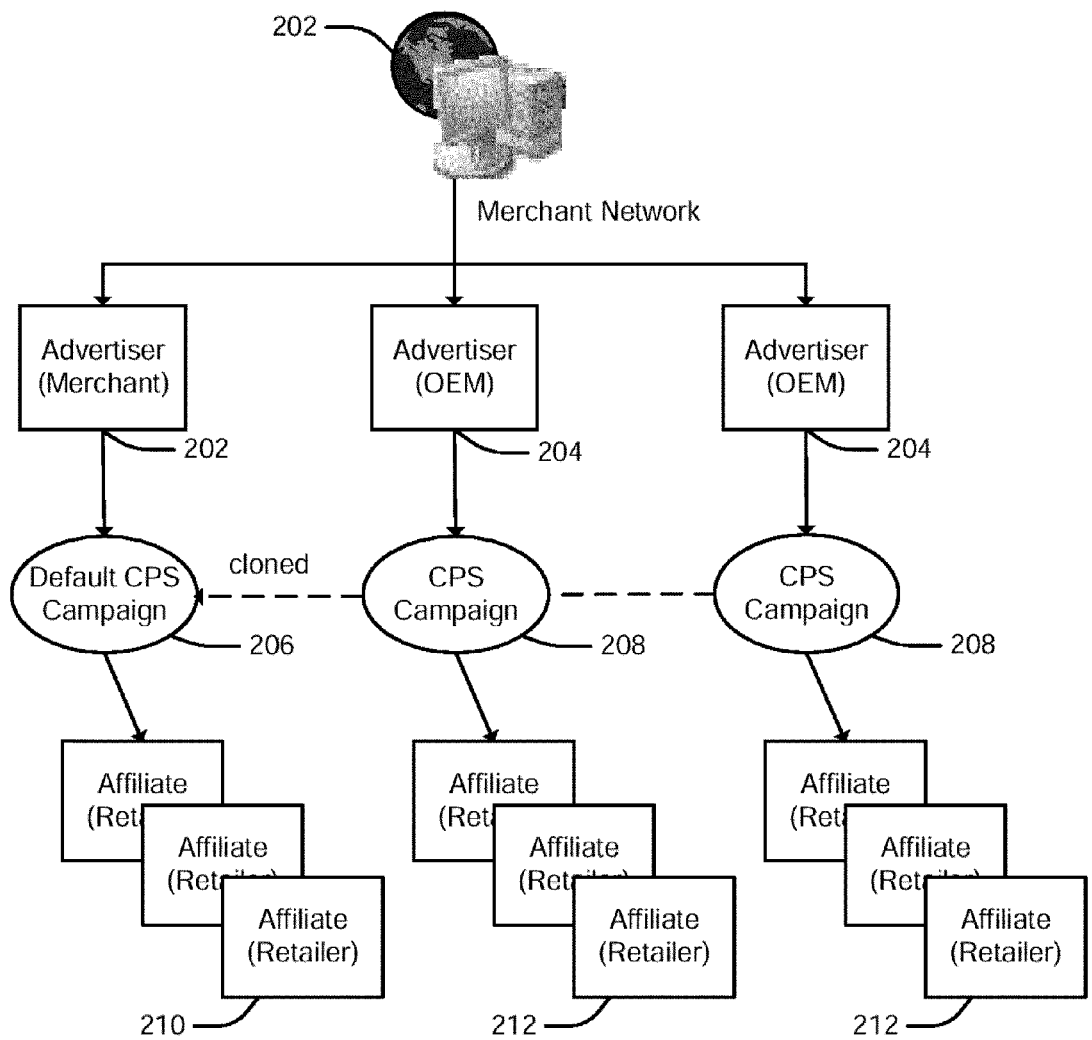
FIG. 2 illustrates an affiliate marketing network hierarchy.

In a preferred embodiment of an integrated software network agent, a merchant may have an affiliate network set up in an AMNS. FIG. 2 is an illustration of such an affiliate hierarchy. In this example of a preferred embodiment system, a merchant 202 is a software vendor with an affiliate network of its own 210, to which it distributes its advertising campaigns 206. The merchant may distribute a trial version of its software from its own web site 202 and to computer OEMs 204, who have affiliate networks of their own 212. When the OEM signs on to the merchant's campaign, the merchant's campaigns may be cloned to the OEM accounts 208. The OEM may preload the software on its machines prior to distribution to the retailer 212 for sale to the end user. An affiliate network system may allow the relationships to be configured in a number of ways. While this preferred embodiment system pertains to preloaded trial software, it can be appreciated by those skilled in the art that it can also be used for software distributed in other ways such as by download from an online purchase.

An AMNS administrator may create the merchant's default cost-per-sale (CPS) campaign 206 and SNA creative for the trial download. This campaign may act as the model for all other campaigns created by members of the network. The administrator may set up the global download link, add creative, specify the linking URL and the trial product linking URL, enter a description and other relevant information and save the creative and links to the system.

A single SNA creative may be set up for each product in the default campaign. Each creative may be described by its product/version name. Each may have a buy, or linking, URL (buyURL) 202 and a trial URL (trialURL) 204 that translate to affiliate links 206. Links such as these redirect the user back to the merchant's site for purchase and activation. Once the creative is setup for the default campaign, all OEM campaigns created thereafter may inherit the creative. If creative changes are needed, changes may need to take place for the default campaign as well as any existing OEM campaign.

Figure 3:
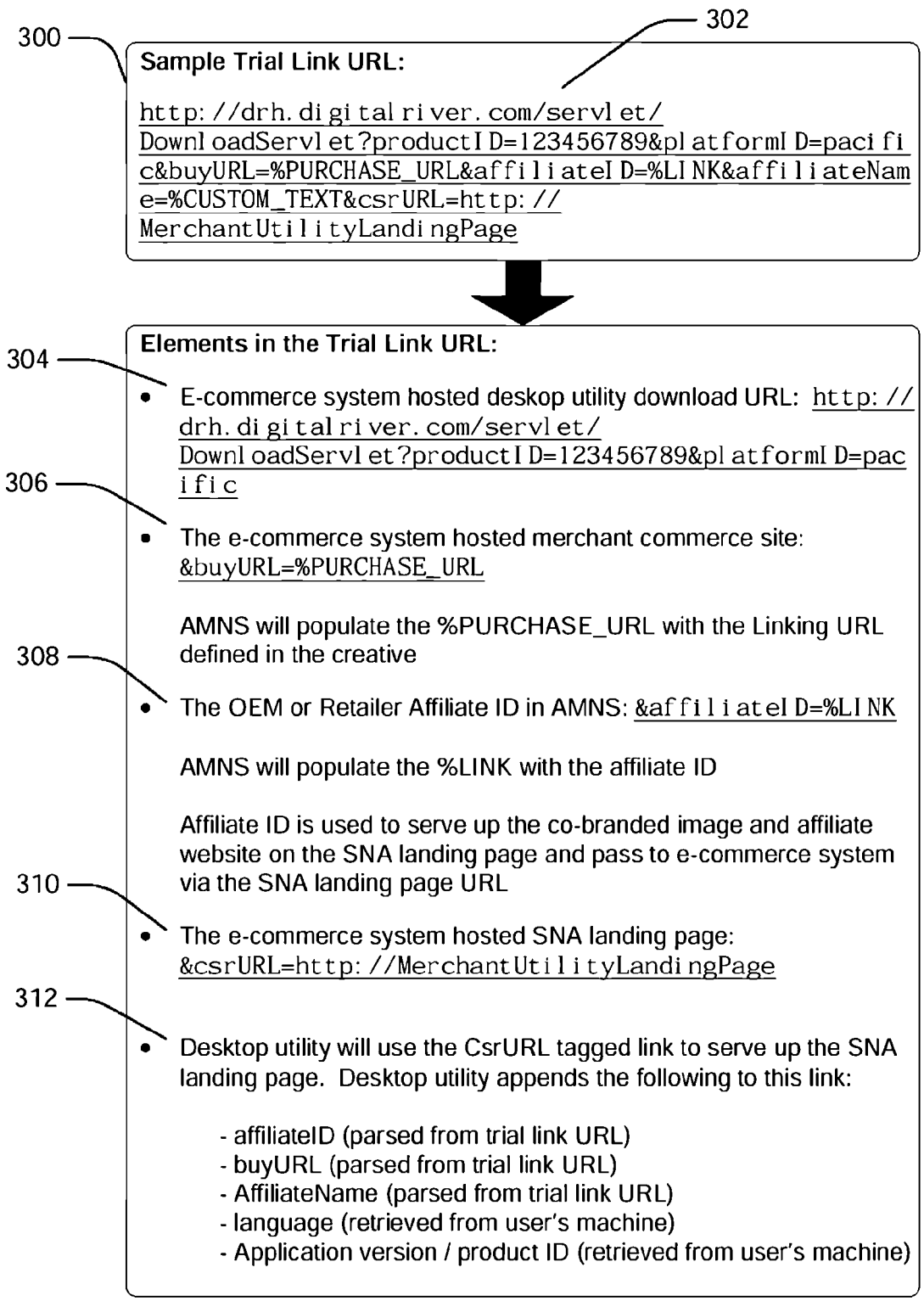
FIG. 3 describes components of a sample trial link universal resource locator (URL).

A trialURL may point to the actual trial download as it is set up in a global e-commerce system 108, and represent the trial activation link of the SNA Desktop Utility (hosted by the global ecommerce system). FIG. 3 shows a sample trial link URL 302:

--- http://drh.digitalriver.com/servlet/DownloadServlet?productID=
63138100&platformID=pacific&buyURL=
%PURCHASE_URL&affiliateID=%LINK&affiliateName=%
CUSTOM_TEXT&csrURL=http://MerchantConfigLandingPage.

---

Exemplary URL variables are further described in the figure: a global e-commerce desktop utility download URL 304 defines the location of the file; a buyURL 306, which provides the Merchant's online store landing page as was defined in the Linking URL field of the creative set up; an OEM or Retailer Affiliate ID in the AMNS 308, which may be used to serve up a co-branded image and affiliate website on the SNA landing page; and a global e-commerce hosted SNA landing page, or csrURL 310. The utility may append additional variables required for the process 312.

Figure 4:
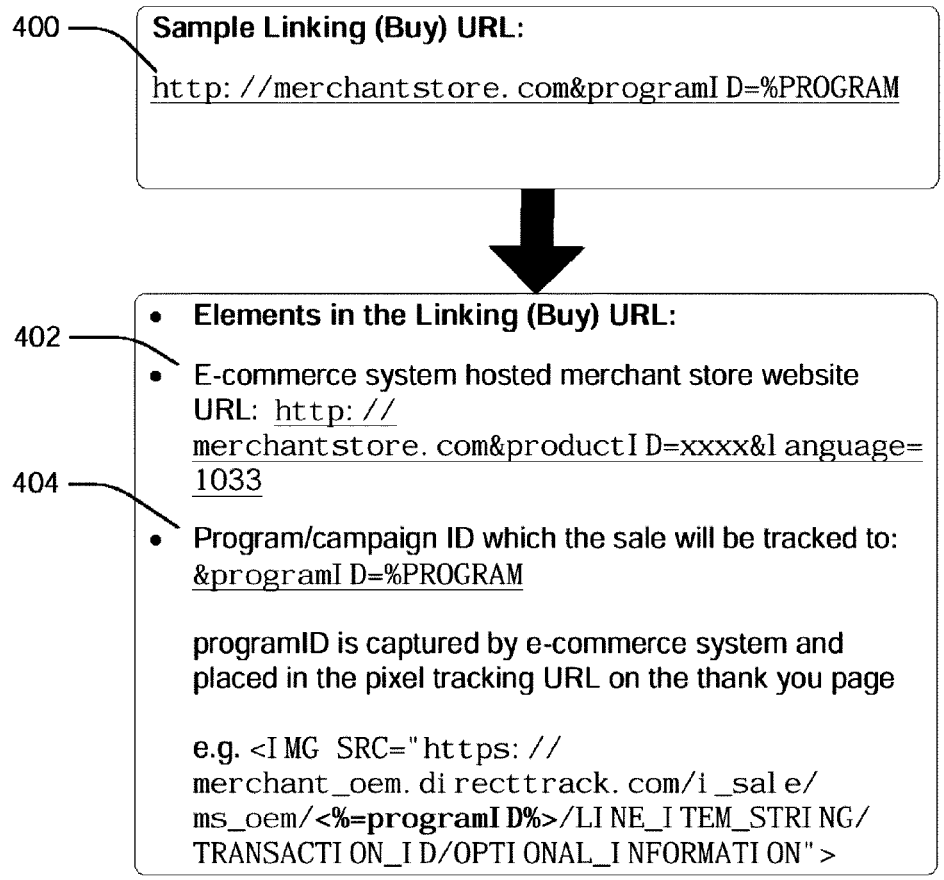
FIG. 4 describes components of a sample linking (or buy URL).

FIG. 4 shows a sample Linking URL (buyURL) and its elements. The URL http://merchantstore.com&programID=%program 400 consists of the global e-commerce-hosted merchant store website URL and the program or campaign ID 402 to which the action will be tracked 404. Sales may be tracked if they occur on the merchant's web site through the SNA and a valid affiliate cookie is detected. A valid affiliate cookie is one generated at the time a consumer clicks on the SNA "Buy from Merchant" link and has not expired or been deleted before the purchase is completed on the merchant's Store.

Figure 5:
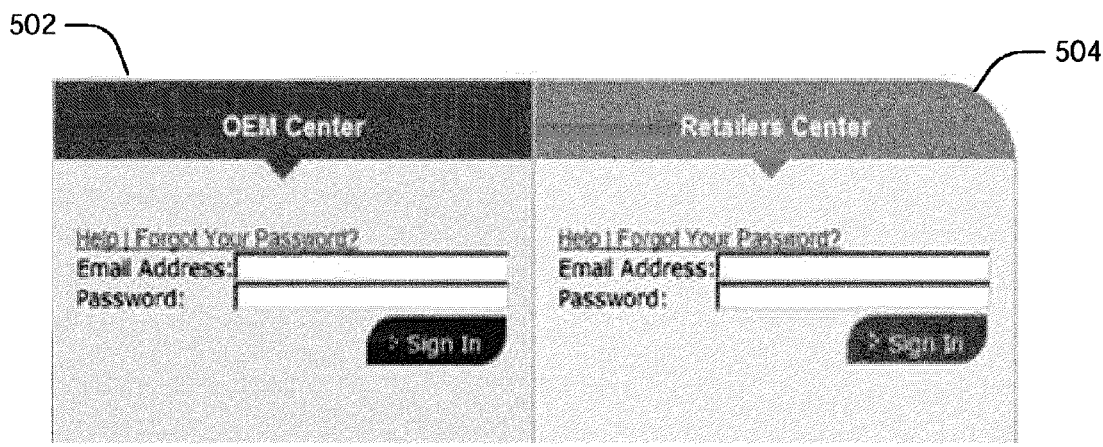
FIG. 5 is a screen shot of an exemplary merchant's affiliate network system's interface for OEM and Retailer signup.

OEMs and Retailers may sign up for the Merchant Network as an affiliate via a branded, localized version of an AMNS Affiliate Interface. FIG. 5 illustrates an exemplary version of this interface used for both OEMs 502 and Retailers 504.

Figure 6:
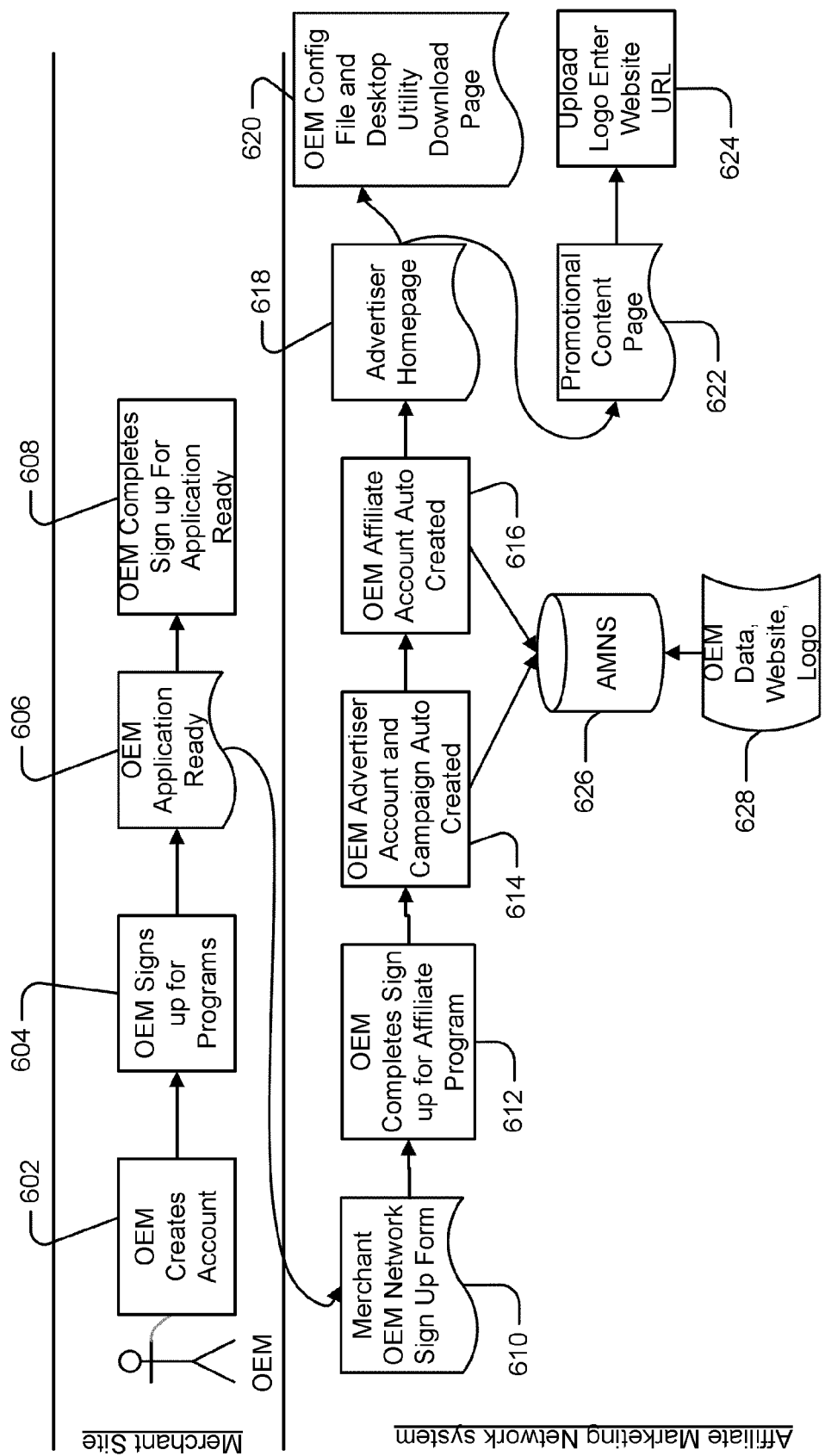
FIG. 6 illustrates the process flow for signing an OEM Network to a merchant's campaign.

FIG. 6 illustrates a process flow for signing an OEM Network to a Merchant's campaign. A Merchant's affiliate marketing network is set up in the AMNS 626. In such a system, at least one Advertiser must be created, which could be the Merchant itself. In this example, an OEM sets up an account through the merchant's affiliate web site 602. When an OEM enrolls into programs 604, it is transparently redirected to the affiliate network system where it completes the sign up process 608. FIG. 7 is a screen shot of an exemplary OEM Sign Up page. An OEM provides all partner information, payment information and site information and submits the application 612, 702. An AMNS 626 may validate the required sign up data and display an error message on the sign-up form if any data is missing or inaccurate. An AMNS 626 may automatically create an Advertiser account and clone a CPS campaign for the Advertiser 614. A campaign may inherit the SNA desktop utility link creative defined in the default Merchant campaign. An affiliate account may also be created automatically 616 and an OEM may be logged into an Advertiser/Merchant interface and may access the campaigns, statistics, help and account information. From that interface 618, an OEM can upload co-branding and promotional content, such as its logo 622, 624, 628 manage Retailers (affiliates), view reports, and download an SNA Desktop Utility and Configuration File Utility (co-branding setup) 620 for distribution with its computers.

Retailers may similarly sign up using the affiliate interface. A Retailer enters partner, payment and site information and submits the application. An AMNS 626 may automatically create an affiliate account, but no campaigns may be created at this time. Retailers should apply to become affiliates of a particular campaign, and their accounts may remain in a pending status until that occurs. When an affiliate account is created, a Retailer may be logged into an Affiliate interface and may view OEM campaigns to which it has been joined.

Figure 8:
FIG. 8 is a screen shot of an exemplary merchant-site campaign page used to view campaigns and co-branding details and upload Retailer or OEM logos.
Figure 9:
FIG. 9 is a screen shot of an exemplary merchant-site campaign page used to edit co-branding information.

OEMs and Retailers with affiliate accounts may manage the promotional content of their utility web pages. To add creative for the customized, co-branded web pages, OEMs and Retailers may upload their logos and websites. FIG. 8 and FIG. 9 illustrate screens that may be used by OEMs and Retailers to maintain campaign information 800 and upload logos and edit co-branding information 902.

Logos may be hosted on an AMNS 626 system using a standard image file directory structure unique only by affiliate ID. This may enable the ecommerce system to reference an AMNS image via a static directory structure and dynamic affiliateID. An AMNS 626 should support preserving any appended query string parameter that passes through a redirect ((e.g., http://oem.dt.com/z/1/CD1&customParam1=xxx&
customParam2=xxxx
should result in:
http://mylandingpage.com&customParam1=xxx&
customParam2=xxxx after the redirect). It also should support an additional affiliate link, unique only by affiliateID to deliver the affiliate's web site on the SNA landing page. For example, Affiliate "CD1" may have a website defined as http://joescomputershack.com. AMNS may create an affiliate redirect link for this website, for example, http://merchantoem.dt.com/z/3/CD1, which may be used as a "Buy Now From: Joe's Computer Shack" link on an SNA landing page. An SNA landing page uses an identifier such as an affiliateID along with a static URL structure to generate an href identifier, specifying the location of a web resource, similar to the image source (e.g. <a href=http://merchant_oem.dt.com/z/3/<%=affiliateID%>>Buy Now From: <%=affiliateName%></a>

An AMNS system may track trial clicks from an SNA configuration file, as well as any trial activations that occur from this trial click (e.g. as a lead for a given OEM campaign). If a lead is tracked, any subsequent sale should also be tracked (e.g. as a sub-sale) to the associated OEM campaign. This way, the sale may be credited to the affiliate.

An AMNS may provide javascript or iFrame code for use on the SNA desktop utility landing page that may dynamically insert the OEM or Retailer's contact information, which was defined at the time of sign-up.

Appropriate URL encoding is used by the SNA desktop utility to ensure all query string parameters passed to the ecommerce system landing page are preserved and do not become malformed causing parsing errors by the ecommerce system.

OEMs and Retailers with affiliate accounts may download the SNA configuration file directly from AMNS. Downloading from AMNS ensures that the consumer's actions are tracked if a purchase is made from the merchant's web site, and that the Retailer is credited for any sale that occurs as a result of the this purchase process.SNA.

Figure 10:
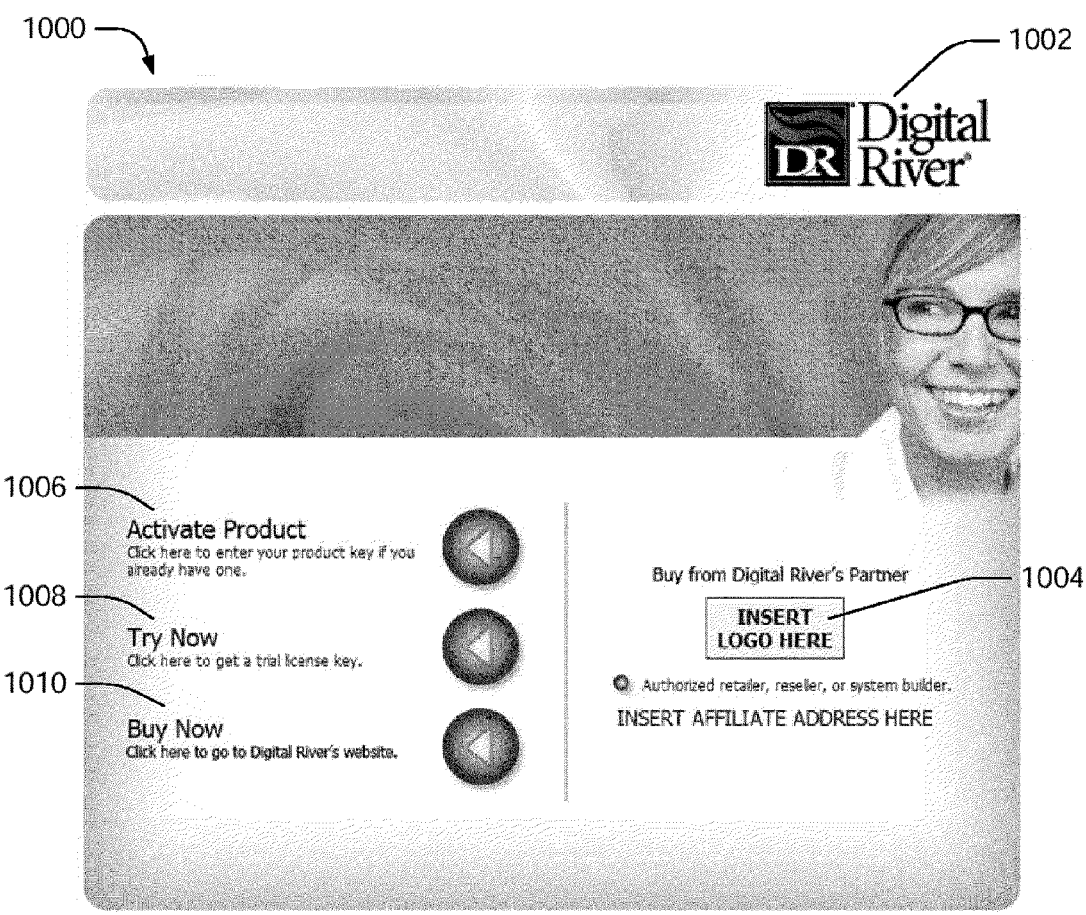
FIG. 10 is a screen shot of an exemplary software network agent landing page.

A generic desktop utility is essentially a crippled browser displaying standard fields required for activating the product, as well as a number of areas, web page "real estate," that may be filled with customized content. FIG. 10 is a screen shot of an exemplary SNA landing page. The page header may contain a banner location 1000 to which a logo or other content may be added. The header also may display the Merchant's logo 1002, and may be configurable for co-branding with the OEM and/or Retailer. The page may contain additional areas 1004 in which OEM and/or Retailer creative can be placed to create the co-branding experience. Links may be provided to activate 1006, try 1008 or buy 1010 the product. The configuration file utility provides the information required to identify the affiliate and customize the user experience with Retailer and OEM identifiers. Creation of the configuration file is described below.

Figure 11:
FIG. 11 is a screen shot of an exemplary process used to download the desktop utility for a Retailer's campaign.

FIG. 11 illustrates the screen of an exemplary process used to download the desktop utility and configuration file for a Retailer's campaign. An OEM or Retailer locates the desired campaign 1102 and may download the associated application and configuration file 1104.

Various query string parameters in the HTTP request are required for setting up the desktop utility. These parameters are listed below in Table 1.

TABLE 1

Configuration File URL Parameters

| Parameter | Description |
|---|---|
| buyURL | The BuyURL value is used to associate the product with the affiliate referral for the purchase and to dynamically populate the "BUY NOW FROM MERCHANT" link |
| affiliateID | The affiliateID value is used by the SNA Configuration file to launch the SNA landing page. It is used to pull in the co-branded logo and the affiliate's buyURL |
| CsrURL | The CsrURL value is used by the SNA Configuration file to launch the SNA landing page |
| TrialURL | The TrialURL value is used by the SNA Configuration file to dynamically populate the "Try Now" link. It is appended to the CsrURL. |
| affiliateName | The affiliateName is passed to the SNA landing page for display. |
| OemID | The OemID is used to identify the network OEM. |

The following is a sample Configuration File:

```
BuyURL=http://merchantoem.AMNS.com/z/10/CD12/
CsrURL=http://trial.tryproduct.com/trialSNA/connect.aspx
TrialURL=http://merchantoem.AMNS.com/z/11/CD12/
AffiliateID=12
AffiliateName=Affiliate
OemID=8
```

This file can include any information that would be required to format the screen to provide a customized user experience. This data is used to create the download URL. Following is a sample download URL:

```
http://drh.digitalriver.com/servlet/DownloadServlet?productID=
81995200&affiliateID=%AFFID&platformID=pacific&buyURL=
%PURCHASE URL&trialURL=%TRIAL URL&CsrURL=
http://gt.com/landingpage&affiliateName=%CUSTOM TEXT
```

The data in the configuration file may create the specific OEM/Retailers experience within the SNA generic desktop utility. The generic desktop utility may also use the configuration file to create the appropriate OEM/Retailer tracking capabilities. The configuration file is dynamic to support being copied to any machine while ensuring the appropriate OEM/Retailer is credited for any software trial conversion. OEMs may not know what Retailer will be selling the machines and thus should be able to download the configuration file with the OEM brand only. In this case, a Retailer may not be recognized or granted credit for a trial to sale conversion of the product. There may also be cases where the Retailer performs the machine imaging and no OEM is identified in the configuration download process. In this case, the Retailer may receive full credit for a trial conversion under the campaign.

A preferred embodiment of this invention provides a great deal of flexibility for making modifications to the user experience. Because the content and flow of the experience are controlled on the server-side, the merchant/OEM/retailer may use experimental design techniques, such as A/B or multivariate testing, to determine which of several versions of display present the best opportunities for conversion (e.g. from a trial to a sale, or from one version of product to another). Test versions of the display, and any subsequent modifications required, may be made by changing the configuration file. If testing shows the merchant/OEM/retailer that a change looks promising, those changes can be made to the display by changing the configuration file without forcing changes on the client.

Consumer Experience and Background Processes

Figure 12A:
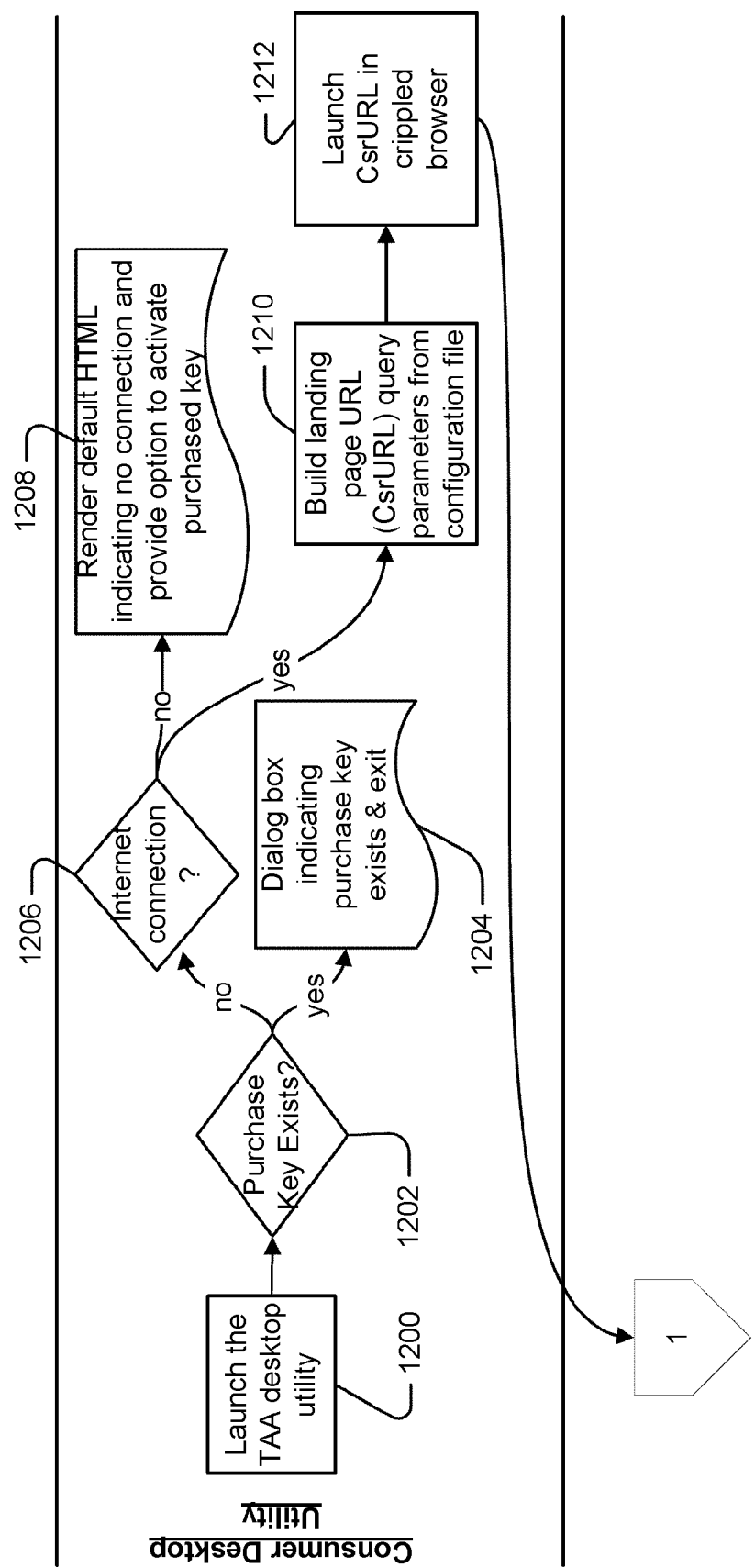
FIGS. 12a and 12b diagram a background processes for downloading the desktop utility and configuration file.
Figure 12B:
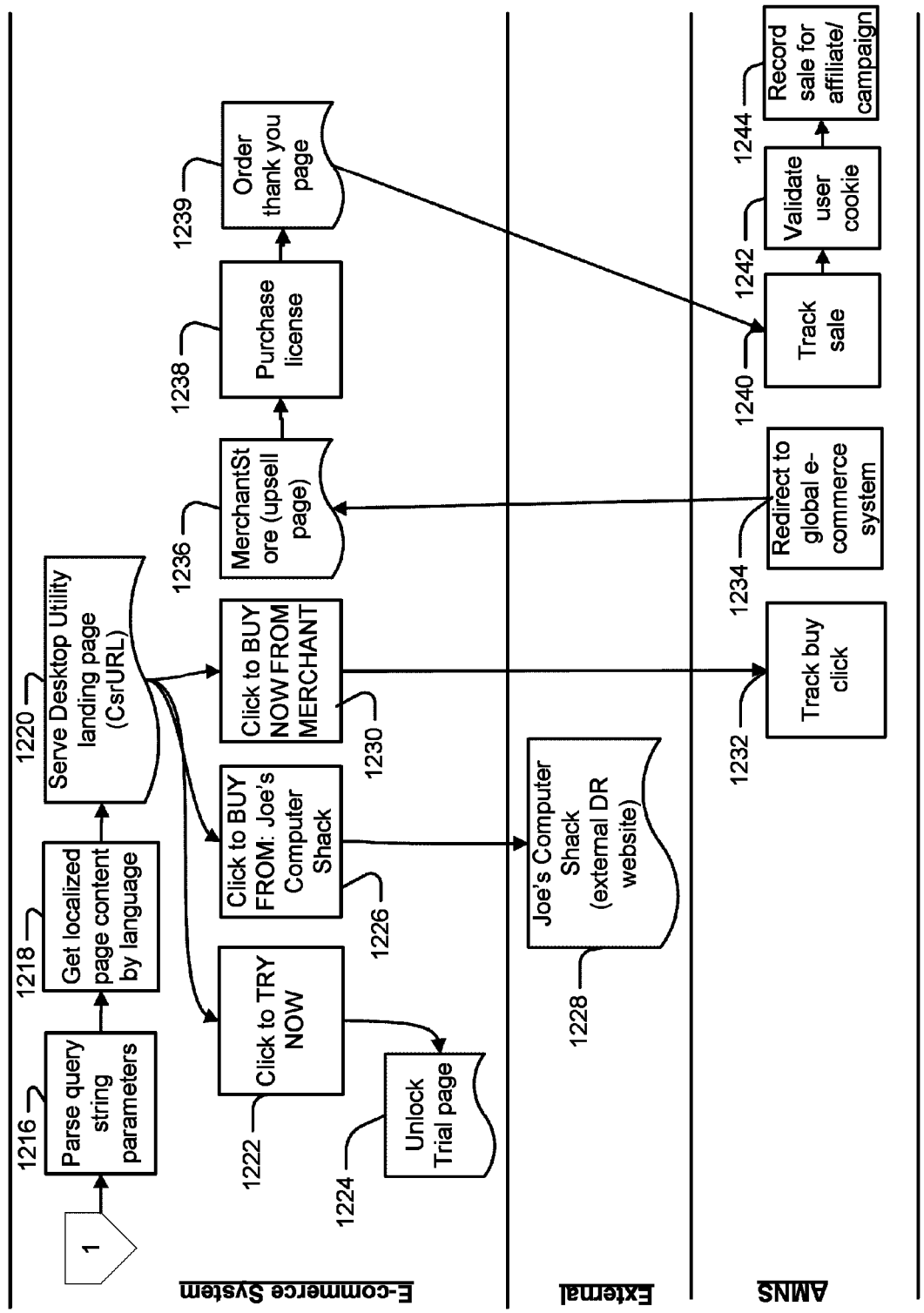

FIGS. 12a and 12b illustrate an example of the consumer experience and background processes using the Software network agent to purchase a product. Referring to FIG. 12a, a consumer has purchased a computer from an OEM partner or affiliate with a trial version of the software and the SNA already installed on the machine. The consumer launches the SNA desktop utility to activate the trial version 1200. The SNA will search for a purchase key 1202. If a purchase key exists, a dialog box displays with a message that a purchase key exists and the process is exited 1204. If there is no purchase key on the system, the SNA desktop utility may search for an internet connection 1206. If none is found a message may display suggesting that the user contact his/her internet service provider if he/she is not able to establish a connection 1208.

Figure 13:
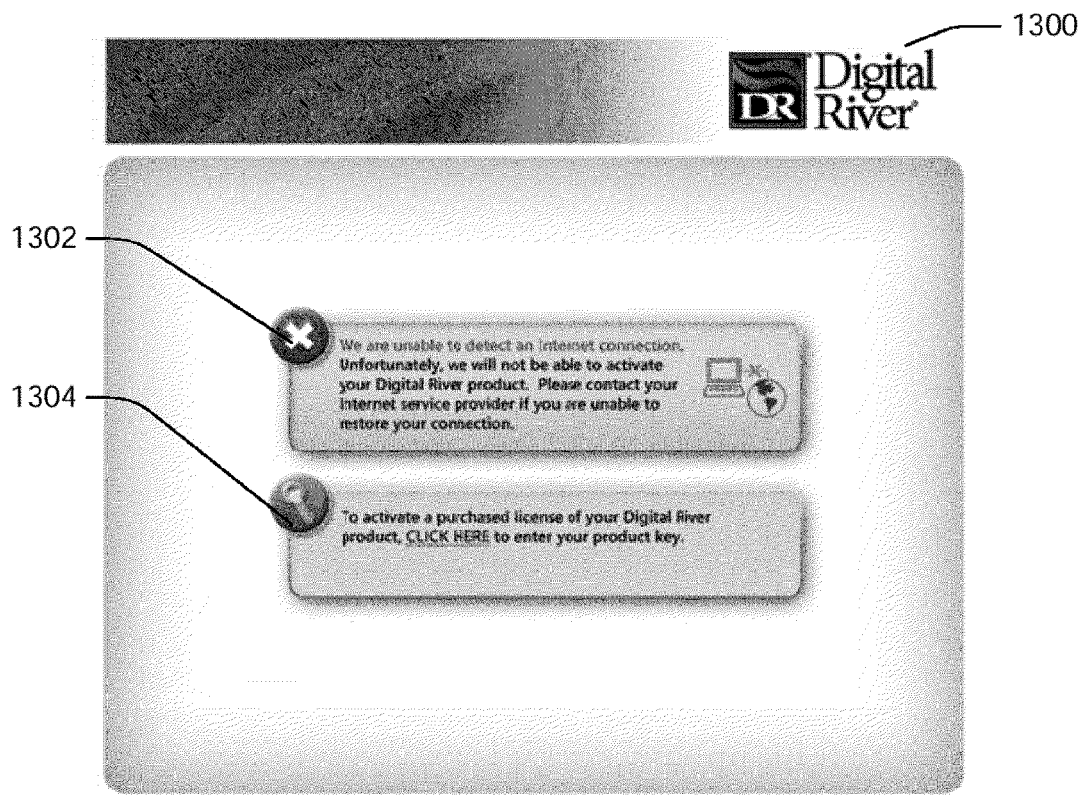
FIG. 13 is a screen shot of the "no internet connection" screen.

FIG. 13 is a screen shot of the internet connection error screen 1300. The screen may display the internet connection message 1302 and an option to enter a key if the user has one 1304. The desktop utility may use an installer to support custom HTML & images for the "no Internet connection" page. The installer may be built to support unloading this HTML page and images to a directory the SNA utility can access when needed. The "no Internet connection" HTML page may support multiple languages and renders the appropriate localized content/page based on the user's machine language setting. If the user's language cannot be detected, the default language of this message may be in English. The installer might require admin privileges to install. During installation of the utility, the OEM or Retailer may be prompted to login as the machine admin or may be prompted to allow the installer to perform a write function (this might depend on the setting of the User Account Control at the time of installation).

Referring again to FIG. 12a, if a connection is found, the SNA desktop utility may construct the necessary URL (the csrURL) to display a global e-commerce system hosted landing page. The following information might be appended to the csrURL 1210, 1212 before making the HTTP request to a global e-commerce system:

Sample csrURL=http://MerchantLandingPage
Appended Parameters:
&affiliateID (available from the configuration file)
&buyURL (available from the configuration file)
&trialURL (available from the configuration file)
&affiliateName (available from the configuration file)
&OEMID (available from the configuration file)
app (Software Version or part number) (retrieved from machine registry)
HKEY_LOCAL_MACHINE\SOFTWARE\Merchant\Product\Registration\{3 0120000-0011-0000-0000000 FF1CE}\ProductID\82503-601-0051017-58326

The system may retrieve information regarding the version of software that has been preloaded and display it on the banner heading. This information may also be used to offer the customer an upsell when s/he lands on the merchant's store to purchase. The system may use the Windows APIs RegOpenKeyEx and RegEnumKeyEx to retrieve this information from the machine's registry.

Figure 14:
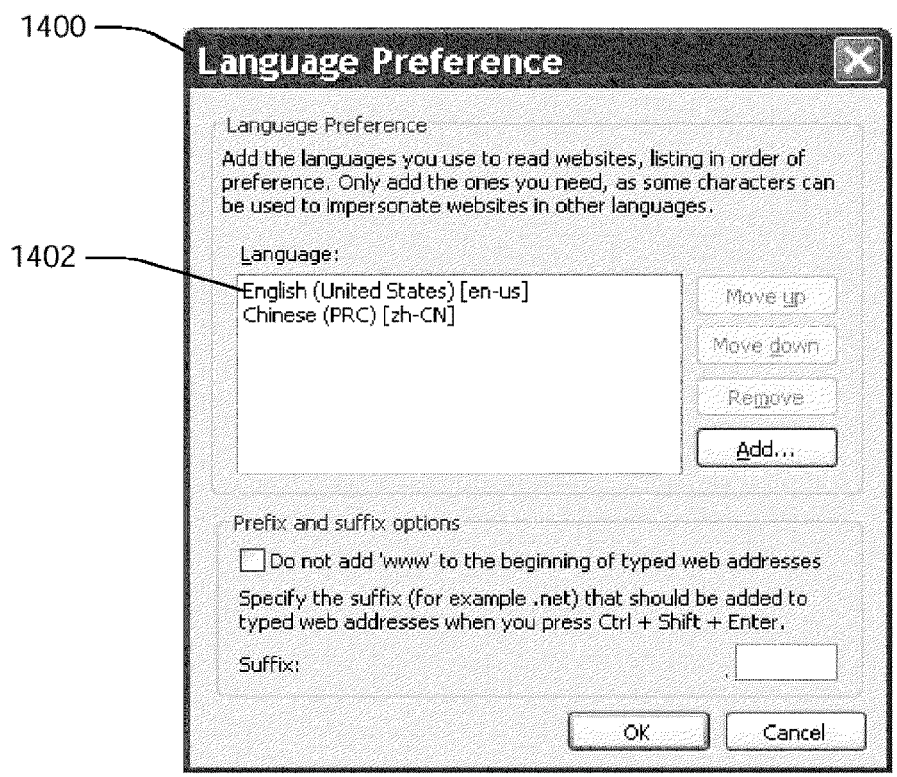
FIG. 14 is a screen shot of the browser language setup.

The Accept-Language is another attribute that personalizes the web page with the consumer's language. This attribute is supplied by the GET HTTP request. The browser locale configuration can be obtained from the Accept_Language field 1402. FIG. 14 shows a screen shot of the browser language setup. A script is used to extract the HTTP_ACCEPT_LANGUAGE header variable from this setup.

Figure 15:
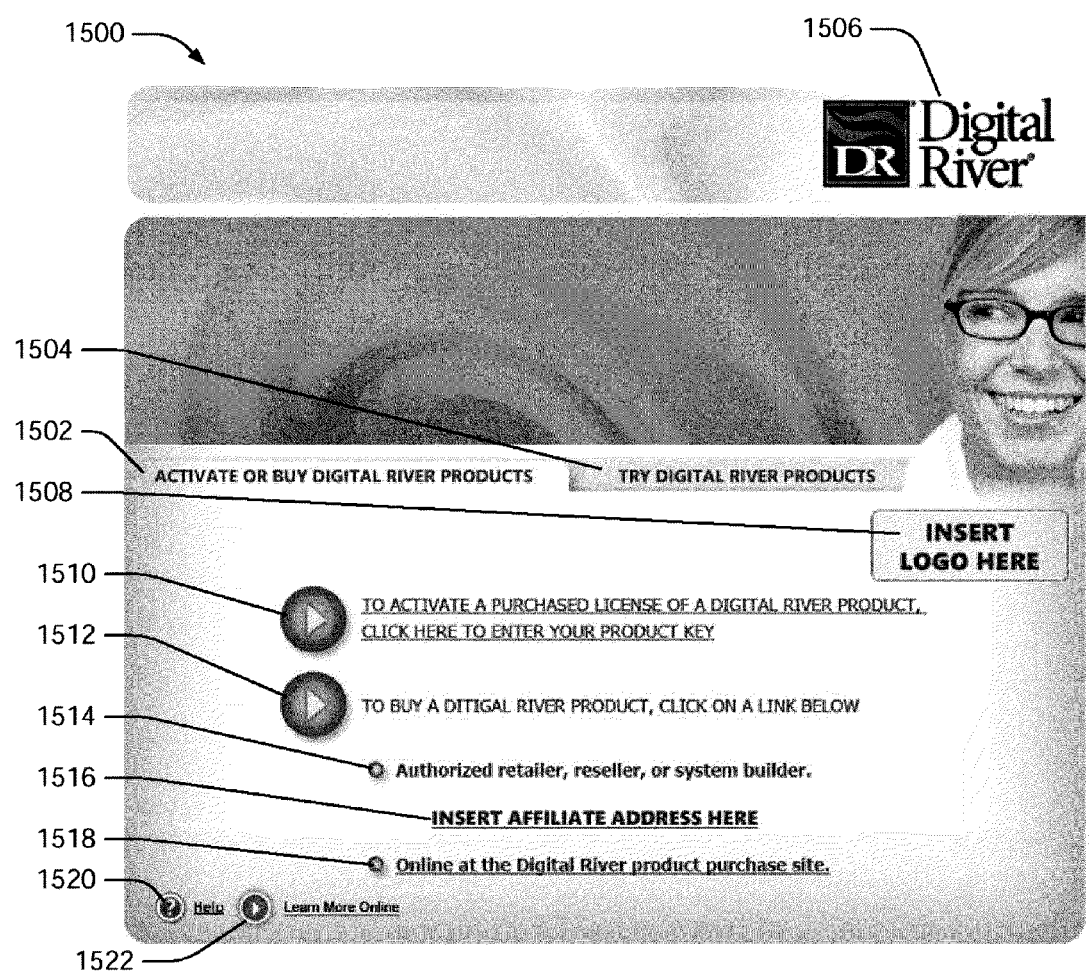
FIG. 15 is a screen shot of the desktop trial activation sample landing page's "activate or buy" tab.

As shown in FIGS. 12b and 15, the HTTP request may be sent to the global e-commerce server, where the query parameters may be parsed 1216 to retrieve localized page content by language 1218. The utility then may request the csrURL to be rendered in the browser 1220 to customize the content for the Retailer and/or OEM (FIG. 15). The configuration file may provide the links to the Retailer's logo to customize the page 1506. The page might have two tabs, as illustrated 1502, 1504: "Activate or Buy" Merchant's Application, or "Try" Merchant's Application. The Activate or Buy tab 1502 might offer the user the opportunity to either activate a purchased version 1510, or buy 1512 from either the Merchant's online store 1518, or the retailer's online store 1514. Tracking in the AMNS might be keyed to purchases on the Merchant's site, and a choice to buy from the retailer's online store may not be tracked; in this case, the process could end there 1232.

FIG. 15 illustrates an exemplary trial landing page for a preferred embodiment of this invention. Table 2 below describes the fields and functions that might be available on the trial landing page.

may be delivered to the consumer and installed. The software product can then be activated with the appropriate purchase version.

When the order thank you page 1239 is displayed, the system logs information in AMNS to credit the sale to Joe's Computer Shack 1240, validates the user cookie 1242 and records the sale for the affiliate campaign 1244.

TABLE 2

SNA Desktop Utility Landing Page Elements

| Field/Button | Type | Validation | Message/Action |
|---|---|---|---|
| Content (1502) and Tabs - Activate or Buy (1502), Try (1503) | Text | Localized based on user's browser language. | |
| Merchant Header (1500) | Image | Localized based on user's browser language. | |
| Merchant's product logo (1500) | Image | | |
| Co-branded logo (1508) | Image | Image source references a static AMNS URL with the appropriate affiliateID (passed as a query string parameter to this page). If no logo exists in the AMNS system, a 1 × 1 pixel image will be returned. This logo is not localized. | |
| TO ACTIVATE A PURCHASED LICENSE . . . (1510) | Text | Localized based on user's browser language. | Closes crippled browser and launches app.exe to allow user to enter license. |
| TO BUY MERCHANT'S PRODUCT, CLICK . . . (1512) | Text | Localized based on user's browser language. | |
| Authorized retailer, reseller . . . (1514) | Text | Localized based on user's browser language. | |
| INSERT AFFILIATE ADDRESS HERE (1516) | Link | Hyperlink that displays address information for retailer. Javascript or iFrame with dynamic affiliate ID <%=affiliateID> | On click, redirects to a new browser window for the retailer's site |
| Online at the Merchant's product purchase site. (1518) | Link | Localized based on user's browser language. Represents the buyURL and additional parameters passed into this page via query string parameters. | On click, records a click in the AMNS system for a given campaign and then redirects to a new browser window with the e-commerce system hosted Merchant conversion site displayed. |
| Help (1520) | Link | Localized based on user's browser language. | On click, displays the help content in an overlay format on the page. |
| Learn More Online (1522) | Link | Localized based on user's browser language. | On click, takes the user to http://www.merchant.com/app/pctrial2008 |

Figure 16:
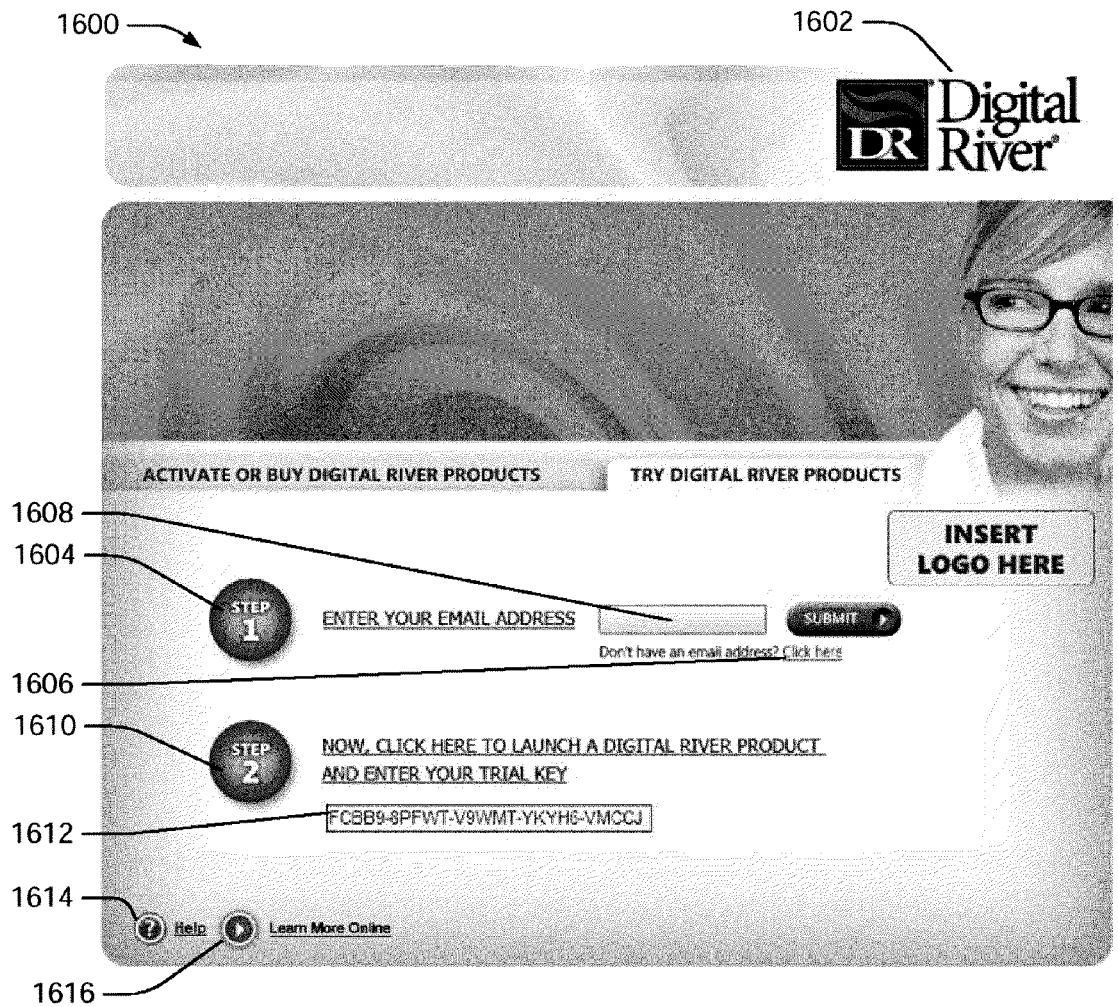
FIG. 16 is a screen shot of the desktop trial activation sample landing page's "try" tab.

Clicking the 'buy from the merchant's' link 1230, 1518 may redirect the user to the Merchant's conversion site and track the buy clicks in the AMNS 1232. The user may be further redirected to the Merchant's global e-commerce store 1234 where s/he may purchase a full licensed product 1236, 1238. The system may check the user's machine to determine which software product or package has been pre-loaded. The user may then be directed to an additional page for purchase depending on what product the system has located on the machine. If the system finds a product that can be sold in multiple versions, the page may display one to several offers from which the user may choose, for instance, to buy the software version associated to the trial installed on the machine or upgrade to a different version. A purchase key If the consumer clicks the tab to "Try" the Application 1222, the trial activation tab is displayed (FIG. 16). This tab allows the user to activate and use the trial version of software that has been loaded onto the user's system. The user enters an email address and the trial activation key, and may click submit to unlock the trial page 1224. In one embodiment of the invention, the system may force the user to provide an e-mail address 1604. The global e-commerce system may capture and store the user e-mail address information and program ID for future e-mail marketing campaigns. The global e-commerce system makes a web service call to generate the trial unlock key. The trial unlock key is displayed on the page 1224. The User then clicks on the link to open and activate the trial with key provided.

Table 3 describes the elements that are included on this page.

TABLE 3

SNA Desktop Utility Trial Activation Page Elements

| Field/Button | Type | Validation | Message/Action |
|---|---|---|---|
| Merchant Activation . . . (header) (1600) | Image | Localized based on user's browser language. | |
| Merchant Product logo (1602) | Image | | |
| (Step 1) Enter your email address (1604) | Text input | Localized based on user's browser language. | |
| Submit (1606) | Button | Localized based on user's browser language. On click, validates that an email address using correct format (someone@something.something) exists | On click, if no email address, a message is displayed indicating that an email is needed to submit the form. On click and valid email address entered, email address is saved/stored in ecommerce system with the programID passed in via the SNA utility. On click, delivers an office trial activation code for the appropriate version of office installed |
| No email "Click here" (1608) | Link | Localized based on user's browser language. | On click, takes the user to http://get.live.com/mail/options |
| (Step 2) Now click here to launch . . . (1610) | Link | Localized based on user's browser language. | This section is grayed out until a valid email address has been submitted and the key returned. On click, keeps crippled browser open and launches winword.exe to allow user to copy/paste license. |
| Product Key Box (1612) | Text | Displays key | Product key generated by ecommerce system via web service call when user submits email address is displayed. |
| Help (1614) | Link | Localized based on user's browser language. | On click, displays the help content in an overlay format on the page. |
| Learn More Online (1616) | Link | Localized based on user's browser language. | On click, takes the user to http://www.merchant.com/app/pctrial2008 |

This next generation software network agent provides several useful and novel features over the prior art. It is a server side activation solution that allows easy changes to design and functionality. It allows a merchant/OEM/Retailer the ability to use experimental design/optimization techniques such as A/B testing and multivariate testing to find the best presentation and functionality for enhancing the consumer experience to increase conversion rates and revenues. The agent provides an opportunity for affiliates in the distribution chain to co-brand the application, allows for dynamic targeting by OEM profile, provides valuable information for future marketing campaigns, and tracks sales to the referring party for reporting and compensation.

System Components for an Alternative Embodiment

Figure 17A:
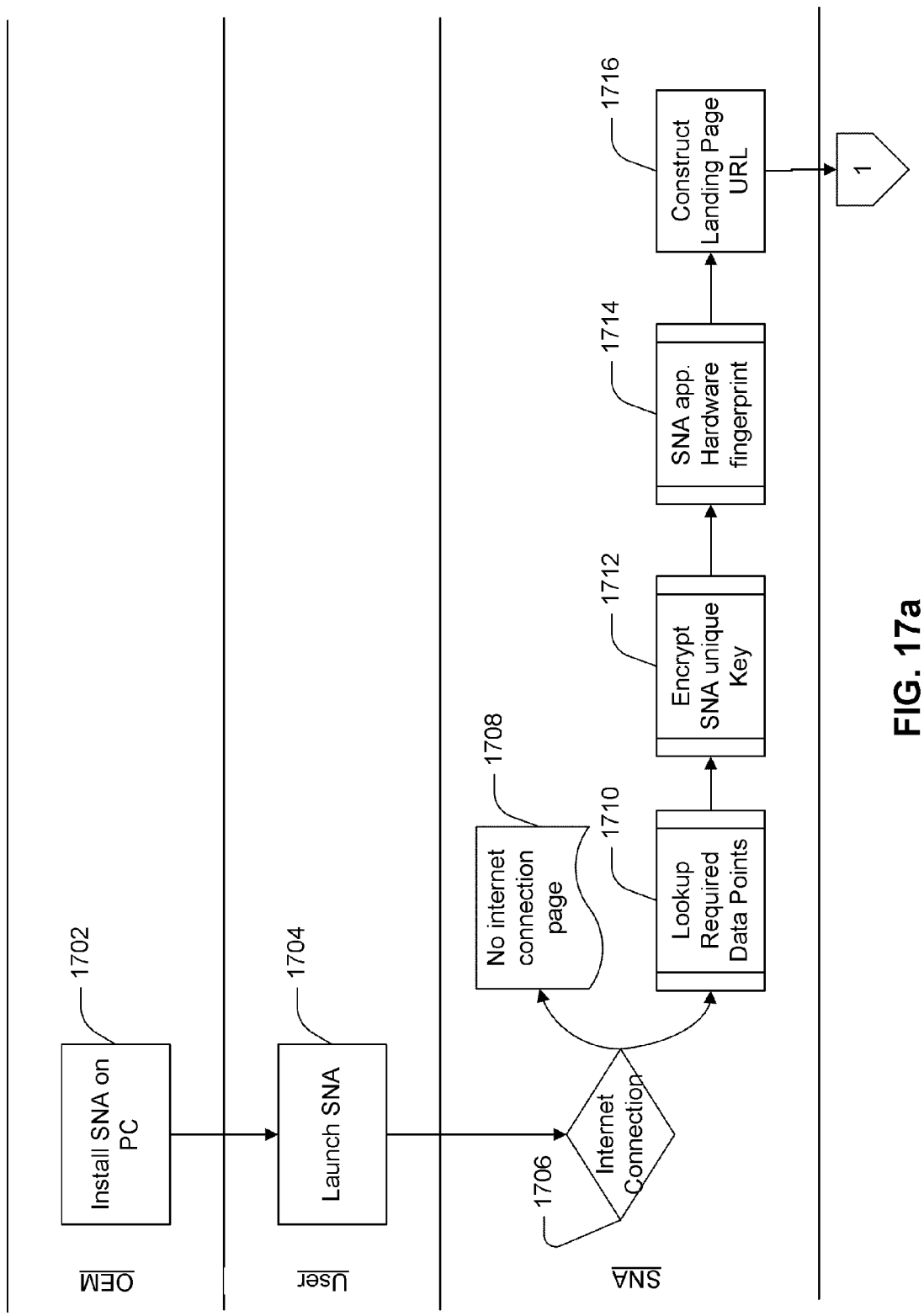
FIGS. 17a and 17b illustrate an alternative embodiment of a software network agent that is not integrated with an affiliated network system.
Figure 17B:
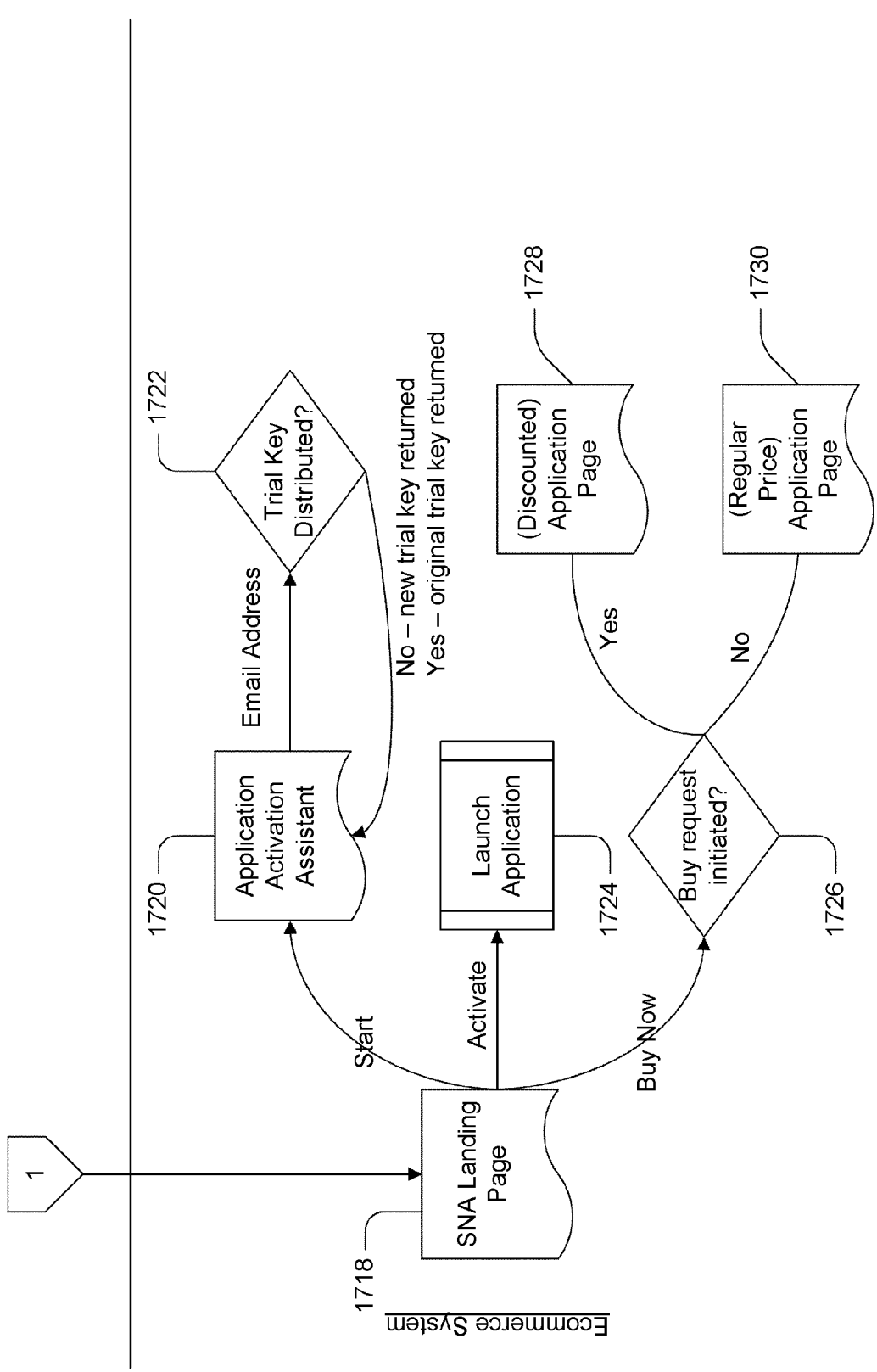

An additional embodiment may not utilize the AMNS, but may leverage other types of services. For example, a software manufacturer may distribute it's software via the OEM partner, but prefer not to track it for affiliate payments. FIGS. 17a and 17b illustrate an example of such a process. In this case, a manufacturer might provide the SNA on its application download site and a configuration file may not be necessary.

The OEM partner, for example, a Netbook PC manufacturer, may install an application and SNA on its product 1702. When the purchaser launches the SNA 1704, the system may check for an internet connection 1706. If there is no connection, a "no internet connection" page might be displayed 1708. If there is a connection, the SNA module searches for the required data points, which may be, for instance, a hardware identifier and/or application data written to the machine's registry when the software was installed 1710. If the required data points are located, the module may select and encrypt a unique SNA key 1712 for the machine, and create an application hardware fingerprint specific to the machine 1714, which may be used to construct the landing page URL 1716. When the user selects the URL the SNA landing page is displayed 1718. The user may be asked for an email address 1720, from which the module may retrieve the trial key 1722 if it has been distributed to the user, for instance, via a prepaid subscription; if not it may return a new key 1722. Once the key has been retrieved, activation may occur, and the application may be launched 1724. If the user chooses to buy and activate 1726 the application instead of activate the trial, the system determines if the installation is eligible for a discounted rate 1728; if not it presents the user with an offer for the regular price 1730.

As mentioned above, the SNA may be implemented as a standalone service and application, but it may be integrated with a number of services besides the ecommerce, AMNS and site optimization services; for example, it may be integrated with web analytics services 113 and/or e-mail marketing 120.

Web analytics 113 provide an ecommerce merchant with data with which to analyze the usage of its web site. Trial and activation requests may be tracked by such a system. Trial and activation requests may include an e-mail address that the merchant may use for an e-mail marketing campaign. Web analytics may be used to track the user's navigation path from the landing page in order to obtain data for future marketing campaigns.

Table 4 describes examples of the type of tracking analytics that may be useful to an ecommerce marketer.

TABLE 4

Sample Tracking Parameters

| | |
|---|---|
| Unique users | The number of times unique end users open the activation application and see the landing page |
| Landing page clicks | The number of clicks on each element of the landing page (e.g. Buy, Activate Retail Key and Start buttons, footer elements (Help, Learn More, Privacy Statement, Terms of Use, Contact Us, etc.) |
| Element clicks | Number of clicks on each element of the prepaid subscription request page (e.g. "Why do we need your email address, click here"; "Don't have an email address, click here"; "Now click here to launch the product and enter your key" etc.) |
| Prepaid keys retrieved | Number of prepaid subscription keys retrieved |
| Permanent keys sold | Number of permanent keys sold |
| Errors | Number of times end-users ended in the "Prepaid Subscription Error" page |
| OEM | OEM manufacturer of the PC and installed the application trial (via a referral tracking code) |
| Language | Which languages displayed by the User Interface |
| Location | Locating of the end users (country) |

Figure 18:
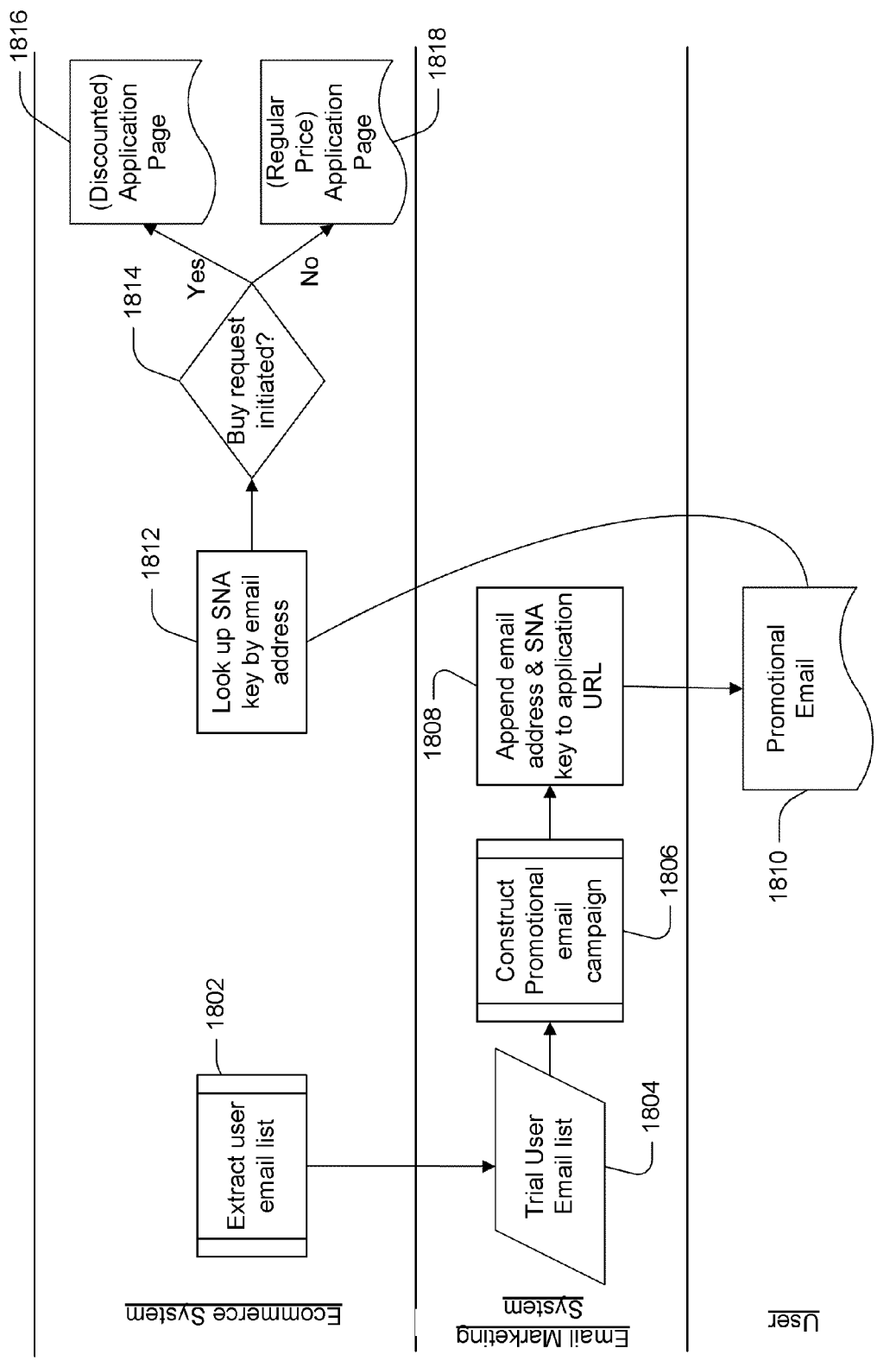
FIG. 18 illustrates the process flow for a software network agent integrated with an ecommerce system and an email marketing system.

The ecommerce system may collect e-mail addresses for each trial activation and export that data to an e-mail marketing system. FIG. 18 provides an illustration of a process flow that may be used by an ecommerce system and an email marketing system to deliver a promotional email campaign to trial users who have provided an email address upon activation of a software trial and have assented to receiving promotional email. An ecommerce system 108 may extract a file 1802 consisting of all of the trial users who have assented to receiving an email promotion and export the file 1804 to an email marketing system 120. The email marketing system 120 might construct a promotional e-mail campaign 1806, append a URL to the email that would direct the user to the ecommerce system and a "buy" application page 1808. The URL might contain the user's email address and assigned, encrypted SNA key 1808. The promotional email is sent to the user 1810; when the user clicks a link on the email page, the system may retrieve the key based on email address 1812. If the user chooses the "buy" link 1814, s/he may be directed to the ecommerce system 108, where the email address may be used to locate the SNA key provided in the email 1812. If the key is found, the user may be offered the discounted (promotional) application page 1816; if not, the user may be offered the regular priced application page 1818.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the web interface such that different communication protocols may be organized or designed differently while maintaining substantially the same functionality and without departing from the scope and spirit of the present invention.

What is claimed is:

1. A software network agent based system, comprising:
a software network agent having an agent software module embodied on non-transitory computer-readable media which includes instructions stored thereon which when executed by a client machine connects through a communication channel to a server and performs the operations of launching a web browser application and opening a landing web page identified by the landing page universal resource locator path by communicating through the communication channel to the server, the landing web page comprising a buy now hyperlink to a buying universal resource locator path based on an original equipment manufacturer identifier, the landing web page further comprising a try now hyperlink to a trial page universal resource locator path so that a user may choose between buying now and trying for a trial period a particular product by selecting one of the buy now and try now hyperlinks; and
an e-mail marketing system coupled to the server and operatively configured to distribute promotional emails to prospective customers identified from the trial page.

2. A software network agent based system having the software network agent and e-mail marketing system of claim 1 and further comprising the server.

3. The software network agent based system of claim 2 wherein the server comprises an interface operatively configured to enable site optimization testing where communications from a first and second software network agent are redirected to different landing web pages according to a website test plan.

4. The software network agent based system of claim 2 wherein the server is coupled to an affiliate marketing system and operatively configured to enable credit of a sale to the affiliate by tracking a user's path to purchase.

5. The software network agent based system of claim 2 wherein the server is coupled to at least one of a web analytic system operatively configured to track user behavior.

6. The software network agent based system of claim 2 wherein the server comprises an interface operatively configured to enable modification of the landing page design while maintaining the software network agent unchanged.

* * * * *